(12) United States Patent
Ur

(10) Patent No.: US 11,824,873 B2
(45) Date of Patent: Nov. 21, 2023

(54) DIGITAL MEDIA AUTHENTICATION

(71) Applicant: Shmuel Ur Innovation LTD., Shorashim (IL)

(72) Inventor: Shmuel Ur, Shorashim (IL)

(73) Assignee: Shmuel Ur Innovation LTD., Shorashim (IL)

(*) Notice: Subject to any disclaimer, the term of this patent is extended or adjusted under 35 U.S.C. 154(b) by 507 days.

(21) Appl. No.: 17/070,198

(22) Filed: Oct. 14, 2020

(65) Prior Publication Data

US 2021/0126929 A1   Apr. 29, 2021

Related U.S. Application Data

(60) Provisional application No. 62/927,292, filed on Oct. 29, 2019.

(51) Int. Cl.
*H04L 9/40* (2022.01)
*G10L 17/06* (2013.01)
*G06V 40/16* (2022.01)

(52) U.S. Cl.
CPC ........ *H04L 63/1416* (2013.01); *G06V 40/172* (2022.01); *G10L 17/06* (2013.01)

(58) Field of Classification Search
CPC .... H04L 63/1416; G06V 40/172; G10L 17/06
USPC .......................................................... 726/23
See application file for complete search history.

(56) References Cited

U.S. PATENT DOCUMENTS

| | | | |
|---|---|---|---|
| 11,417,343 B2* | 8/2022 | Cohen | G10L 17/20 |
| 2015/0379253 A1* | 12/2015 | Cook | G06F 21/32 |
| | | | 726/19 |
| 2017/0289168 A1* | 10/2017 | Bar | H04L 63/102 |
| 2019/0130172 A1* | 5/2019 | Zhong | G06V 40/168 |
| 2020/0288204 A1* | 9/2020 | Duersch | G06F 18/23213 |

* cited by examiner

*Primary Examiner* — Dereena T Cattungal
(74) *Attorney, Agent, or Firm* — Robert Goozner

(57) ABSTRACT

A method, system and product including obtaining a media stream depicting a real-time communication of a participant in a communication context; identifying the communication context; obtaining a personalized model of the participant when communicating in the communication context, wherein the personalized model is configured to identify a behavioral pattern of the participant; executing the personalized model on at least a portion of the media stream to determine whether a behavioral pattern of the participant in the media stream matches the behavioral pattern of the participant according to the personalized model; and upon identifying a mismatch between the behavioral pattern of the participant in the media stream and the behavioral pattern of the participant according to the personalized model, performing a responsive action.

17 Claims, 4 Drawing Sheets

DIGITAL MEDIA AUTHENTICATION

CROSS-REFERENCE TO RELATED APPLICATION

This application claims the benefit of provisional patent application No. 62/927,292, entitled "Personalized Media Validation" filed Oct. 29, 2019, which is hereby incorporated by reference in its entirety without giving rise to disavowment.

TECHNICAL FIELD

The present disclosure relates to authenticating digital media in general, and to authenticating communications associated with a person using a personalized model of the person, in particular.

BACKGROUND

Modern techniques enable to create fake videos and audio to look convincing and authentic, using one or more techniques. Such media can be used to generate fake news, to promote disinformation, or the like.

BRIEF SUMMARY

One exemplary embodiment of the disclosed subject matter is a method comprising: obtaining a media stream associated with a participant, wherein the media stream depicting a real-time communication of the participant in a communication context; identifying the communication context; obtaining a personalized model of the participant when communicating in the communication context, wherein the personalized model is configured to identify a behavioral pattern of the participant; executing the personalized model on at least a portion of the media stream to determine whether a behavioral pattern of the participant in the media stream matches the behavioral pattern of the participant according to the personalized model; and upon identifying a mismatch between the behavioral pattern of the participant in the media stream and the behavioral pattern of the participant according to the personalized model, performing a responsive action.

Optionally, the responsive action comprises generating an alert or blocking the real-time communication, wherein the alert indicates that the media stream is forged.

Optionally, identifying the mismatch comprises determining that a difference between the behavioral pattern of the participant in the media stream and the behavioral pattern of the participant according to the personalized model exceeds a threshold.

Optionally, the personalized model comprises a classifier that is trained on a dataset, wherein the dataset comprises media records depicting communications of the participant in the communication context.

Optionally, the dataset comprises a first class of media and a second class of media, wherein the first class comprises media records originally depicting the participant in a communication context, wherein the second class comprises media records originally depicting other people excluding the participant in the communication context, the method comprising training the personalized model to classify media as belonging to the first class or to the second class.

Optionally, media fabrication techniques may be implemented on the first class, thereby obtaining processed records of the participant, wherein said media fabrication techniques are configured to replace the participant with different people excluding the participant, media fabrication techniques may be implemented on the second class, thereby obtaining processed records of the other people, wherein said media fabrication techniques are configured to replace the other people, the processed records of the participant may be added to the first class, and the processed records of the other people may be added to the second class.

Optionally, implementing the media fabrication techniques on the second class may comprise superimposing the participant over at least some of the other people.

Optionally, a first personalized model of the participant may be trained under a first communication context, and a second personalized model of the participant may be trained under a second communication context.

Optionally, the communication context may be a friendship relationship, a co-working relationship, a family relationship, a business relationship, a customer-client relationship, a romantic relationship, or the like.

Optionally, the communication context comprises a topic of the real-time communication, or the like.

Optionally, an identity of the participant is determined based on at least one of: a facial recognition method implemented on the media stream, an audio recognition method implemented on the media stream, metadata of the media stream, and tags relating to the participant that are attached to the media stream, wherein the communication context comprises the identity of the participant.

Optionally, identifying the communication context comprises determining a second participant in the real-time communication, wherein the media stream depicts the real-time communication between the participant and the second participant; wherein the communication context is a context of the participant communicating with the second participant; and said obtaining the personalized model comprises obtaining a private model generated based on past communications between the participant and the second participant, wherein the past communications are not publicly accessible.

Optionally, the behavioral pattern of the participant comprises face movements of the participant, face gestures of the participant, a gait of the participant, a walking pattern of the participant, hand movements of the participant, frequently used phrases of the participant, a talking manner of the participant, a voice pattern of the participant, or the like.

Optionally, the method is implemented on a communication system used by a second participant, wherein the communication context is a communication between the participant and the second participant, wherein the communication system is configured to retain communications between the participant and the second participant and to generate a private model for the communication context based on the retained communications.

Another exemplary embodiment of the disclosed subject matter is a computer program product comprising a non-transitory computer readable storage medium retaining program instructions, which program instructions when read by a processor, cause the processor to: obtain a media stream associated with a participant, wherein the media stream depicts a real-time communication of the participant in a communication context; identify the communication context; obtain a personalized model of the participant when communicating in the communication context, wherein the personalized model is configured to identify a behavioral pattern of the participant; execute the personalized model on at least a portion of the media stream to determine whether a behavioral pattern of the participant in the media stream matches the behavioral pattern of the participant according to the personalized model; and upon identifying a mismatch between the behavioral pattern of the participant in the media stream and the behavioral pattern of the participant according to the personalized model, perform a responsive action.

Yet another exemplary embodiment of the disclosed subject matter is a system, the system comprising a processor and coupled memory, the processor being adapted to: obtain a media stream associated with a participant, wherein the media stream depicts a real-time communication of the participant in a communication context; identify the communication context; obtain a personalized model of the participant when communicating in the communication context, wherein the personalized model is configured to identify a behavioral pattern of the participant; execute the personalized model on at least a portion of the media stream to determine whether a behavioral pattern of the participant in the media stream matches the behavioral pattern of the participant according to the personalized model; and upon identifying a mismatch between the behavioral pattern of the participant in the media stream and the behavioral pattern of the participant according to the personalized model, perform a responsive action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
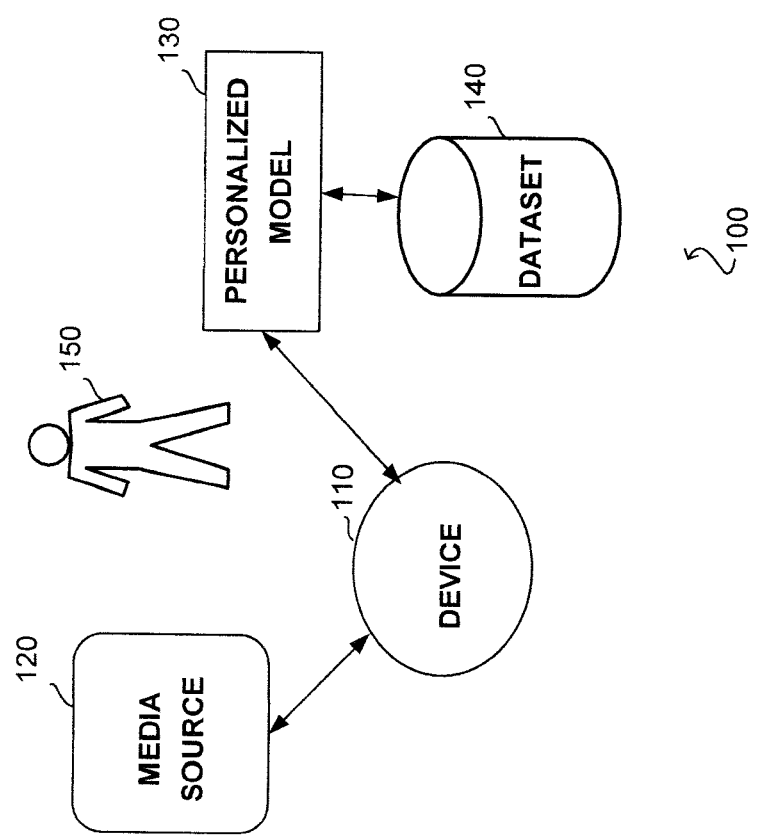
FIG. 1 shows a schematic illustration of an exemplary environment in which the disclosed subject matter may be utilized, in accordance with some exemplary embodiments of the disclosed subject matter.

One technical problem dealt with by the disclosed subject matter is authenticating an identity of a participant whose features are incorporated in digital media such as a video, an audio stream, or the like. In some exemplary embodiments, digital media may be manipulated using one or more media fabrication technologies such as deepfake (a portmanteau of "deep learning" and "fake") techniques. In some exemplary embodiments, the digital media may be manipulated by replacing a first person with another person such as by superimposing a target person on a video that originally depicted an original person, by superimposing a voice of one person on a given audio where a different, original, person is speaking, or the like. In some exemplary embodiments, it may be desired to determine if a currently displayed person was originally captured in the video or whether he was superimposed on the video by a media manipulator. Similarly to the above, it may be desired to determine if a person's voice in an audio is authentic or was generated.

In some exemplary embodiments, manipulation techniques of digital media may be configured to fabricate audio and video, e.g., using artificial intelligence, deepfake techniques, or any other manipulation technique. In some cases, digital media may be fabricated utilizing a Generative Adversarial Network (GAN) that is configured to generate manipulated media at a generative network, and to evaluate the generated media at a discriminative network, e.g., thereby enhancing a level of the fabrication. In some exemplary embodiments, fabricated media may be created using a plurality of alternative techniques, such as by generating a fake video of a participant based on one or more pictures of the participant, by creating synthetic media, or the like.

In some exemplary embodiments, media manipulations may include manipulating Augmented Reality (AR) layers which may enable a user to switch between different people captured in an image, to modify faces, switch between captured objects, or the like. In some cases, human image synthesis may be performed, e.g., to show victims saying or doing things that they never said or did. In some exemplary embodiments, existing images and videos may be combined or superimposed onto source images or videos, thereby enabling to replace one participant with another, lip-sync a filmed person according to a determined audio, swap a certain filmed face with another face, or the like.

In some exemplary embodiments, manipulated media may be misused, for example, for creating fake news, theft, identity frauds, or the like. This may be done by depicting one or more people saying things or performing actions that never occurred in reality, such as altering words or gestures of a figure to make it look like he said or did something which he has not.

Another technical problem dealt with by the disclosed subject matter is to eliminate digital fabrication attacks such deepfake attacks which may be used for spoofing communications such as phone calls, videos, audio messages, or the like. In some cases, an attack scenario may include spoofing a phone number to forge a phone call, an audio message, or a video-based communication such as a video conference, for example, with a familiar person. As an example, a recipient may receive a forged phone or video call from his boss, and while thinking it is actually his boss, the recipient may follow instructions provided from the manipulator during the forged phone call.

Yet another technical problem dealt with by the disclosed subject matter is to authenticate an identity of a participant in a real time media stream, such as a real time telephone call, video call, or any other digital communication medium. In some exemplary embodiments, it may be desired to determine whether or not real time communications are tampered with, or whether they are authentic. In some exemplary embodiments, every individual participant may be characterized by one or more unique behavioral patterns which may include unique face movements, gait, walking patterns, voice patterns, hand movements, or the like. In some exemplary embodiments, manipulation techniques may typically replace a first person with a second person by causing the second person to imitate behavioral patterns of the first person. In some exemplary embodiments, manipulation techniques may not necessarily be able to accurately imitate unique behavioral patterns of a person whose features are used to forge digital media.

For example, a video incorporating a woman named Alice may be manipulated to replace Alice with a man named Bob, e.g., using deepfake techniques or any other media manipulation technique. However, it may be difficult to replace a body language of Alice with a body language of Bob, for example, since a body language of a participant may be unique, subtle and difficult to identify and even more so, to fabricate. For example, Bob may experience very frequent eye twitching, while Alice's eyes may twitch only on rare occasions. In some cases, a manipulated video may depict Bob twitching his eyes in the same pattern as Alice, in contrary to his typical body language. In another example, Bob may limp and have walking patterns that are very different from Alice's walking patterns, but the manipulated video may depict Bob walking in a walking patterns that are similar to Alice's without limping. As another example, the behavior of Alice may be characterized by performing generally symmetrical body gestures, while Bob may not. As a result, the manipulated video may depict Bob while performing symmetrical body gestures that are uncharacteristically for him. In another example, Alice may stutter every time she says "apple" or starts a sentence. According to this example, a deepfake may produce a forged audio of Alice by superimposing Alice's voice on an audio of Bob. However, the forged audio may not include the stuttering that is typical to Alice.

One technical solution provided by the disclosed subject matter may be authenticating an identity of a participant whose features are incorporated in a digital media by using a personalized context-sensitive model of the participant. In some exemplary embodiments, a personalized model of the participant may be trained to identify behavioral patterns of the participant with respect to a certain communication context, e.g., an identity of the participant, a type of relationship between the communicating people, a topic of the communication, or the like. In some exemplary embodiments, the context may relate to an interaction, a type of the interaction, a role of a participant in the interaction, or the like. In some exemplary embodiments, different contexts of the communication associated with the participant may require a separate personalized model, e.g., which may be trained on the same context. Additionally or alternatively, a single personalized model may be configured to be context-sensitive, and may be utilized for a plurality of contexts. In some exemplary embodiments, the personalized model may include a machine learning model, a deep learning model, a classifier, a predictor, or the like.

In some exemplary embodiments, every participant may be characterized with unique behavioral patterns that may be expressed in corresponding situations and scenarios. For example, a participant may be characterized with a certain unique behavioral pattern when interacting with children, which may differ from his behavioral pattern when interacting with his boss, his subordinates, his spouse, or the like. In some cases, behavioral patterns of a same participant may differ in their intonations, tones, assertiveness levels, body language, vocabulary, facial expressions, or the like, when interacting with different entities or entity types.

In some exemplary embodiments, within a same context, behavioral patterns of a person may be consistent. In some exemplary embodiments, a typical interaction of a person may be classified as belonging to one or more common categories, such as an interaction with a boss, a spouse, a child, a co-worker, or the like. For example, an interaction of a person with a child may be characterized by a certain body language that is unique to the person when communicating with children, e.g., certain voice intonations, tones, or the like. An interaction of the same person with co-workers may be characterized by a slightly different body language, voice intonations, tones, or the like. In some exemplary embodiments, an interaction of a person may be classified according to a specific identity of the person with which he is interacting. In some exemplary embodiments, within a same category of relationships, behavioral patterns of a person may vary. For example, the person may interact differently with different co-workers, although they may belong to a same category. In some exemplary embodiments, an interaction of a person may be classified according to a specific conversation topic that is discussed. In some exemplary embodiments, within a same interaction, behavioral patterns of a person may vary according to a topic or emotional state of the person.

In some exemplary embodiments, although many behavioral patterns of a person may alter in different scenarios, other behavioral patterns of the same person may stay consistent regardless of the specific scenario. For example, a stutter of a person may be consistent in different situations and scenarios. As another example, some subconscious behaviors may be consistent in different contexts, as the person may not be able to control them.

In some exemplary embodiments, based on unique behavioral patterns of a participant in a specific communication context, a personalized model of the participant in the context may be generated, created, or the like. In some exemplary embodiments, the personalized model of the participant may be generated for a user communicating with the participant. In some exemplary embodiments, the personalized model of the participant may be configured to identify one or more behavioral patterns of the participant, and compare them with identified behavioral patterns of the participant in real time digital media. In some exemplary embodiments, the comparison may indicate whether the depicted participant is an authentic version of himself, or whether the depicted participant is a fabricated version of the participant.

In some exemplary embodiments, media manipulation or deepfake techniques may be able to utilize publicly available media of a public figure, e.g., the president, and train a personalized model of the president based thereon, in order to create a fabricated media that matches the behavioral patterns of the public figure as identified in the public media. In some exemplary embodiments, the public figure may act differently in different contexts, so that the public media may not be accurate for some non-public communication contexts of the same public figure. For example, a personalized model of the president that is trained on public speeches of the president may not be able to fabricate accurate behavioral patterns of the president when speaking with his child. In some exemplary embodiments, as media manipulation techniques may not have access to private media of the public figure, it may be more difficult for forging entities to train a model to fabricate the public figure's behavioral patterns in non-public contexts of communication.

In some exemplary embodiments, with respect to private people—there may not be a large amount of publicly accessible media depicting their behavior, e.g., an amount that is large enough to train a personalized model. In some exemplary embodiments, as media manipulation techniques may not have access to private media of private people in different communication contexts, it may be difficult to train a fraud model to fabricate the private person's behavioral patterns in one or more contexts of communication, e.g., in order to spoof a call. In some exemplary embodiments, communication media records of a person in non-public contexts may be typically available at a user device communicating with the person. In some exemplary embodiments, personalized models may be trained to identify a person with which the user is communicating in non-public contexts, based on media of the person that is not publicly accessible.

In some exemplary embodiments, a media stream associated with a participant, such as a real-time media stream, may be obtained. In some exemplary embodiments, the media stream may be obtained from a media source such as a broadcast, a radio-based communication, a phone call, a video call, a FACBOOK™ live stream, a YOUTUBE™ live stream, or the like. In some exemplary embodiments, the media stream may be captured or displayed at a computing device of a user, e.g., via an application of the device, a camera of the device, a browser of the device, or the like. In some exemplary embodiments, the media stream may depict a communication of the user with a participant in a specific communication context, e.g., during an interaction of a certain type. In some exemplary embodiments, the media stream may or may not be publicly accessible, publicly available, or the like.

In some exemplary embodiments, the communication context of the participant, as depicted in the media stream, may be identified. In some exemplary embodiments, the communication context may be a context of the interaction between the user and the participant. In some exemplary embodiments, the communication context may comprise a friendship relationship, a co-working relationship, a romantic relationship, a family relationship, a business relationship, a customer-client relationship, or the like. In some exemplary embodiments, the communication context may comprise the identity of the participant. In some exemplary embodiments, the communication context may comprise an emotional state or topic of conversation. In some exemplary embodiments, the media stream may depict the communication between the user, the participant and any additional participants.

In some exemplary embodiments, the communication context may be identified based on identities of participants of the interaction such as an identity of the participant in the communication, based on a manner of referring to each participant, based on attributes of interaction such as a level of formality, based on classifications of the interaction, or the like. In some exemplary embodiments, the identity of the participant may be determined based on a facial recognition method implemented on the media stream, an audio recognition method implemented on the real-time media stream, tags relating to the participant that are attached to the real-time media stream, or the like.

In some exemplary embodiments, a personalized model of the participant, when communicating in the communication context, may be obtained. In some exemplary embodiments, the personalized model may be configured to identify one or more behavioral patterns of the participant, which may be matched against behavioral patterns of the real time communication. In some exemplary embodiments, the behavioral patterns of the participant may comprise face movements of the participant, face gestures of the participant, a gait of the participant, a walking pattern of the participant, hand movements of the participant, frequently used phrases of the participant, a talking manner of the participant, a voice pattern of the participant, or the like.

In some exemplary embodiments, obtaining the personalized model may include obtaining a private model generated based on past communications or interactions such as private or non-public communications between the user and the participant (e.g., video conferences between the user and the participant in the past; phone calls between the user and the participant; or the like), a category of the participant, or the like. In some exemplary embodiments, the media stream may depict a real-time communication of the user with the participant, which may be identified as the communication context. In some exemplary embodiments, the past communications, as well as the private model, may not be publicly accessible, e.g., as it may include communications of the participant and the user, which may be sensitive by nature. In some exemplary embodiments, one or more personalized models in the possession of the user may be examined to identify therein a personalized model of the participant that matches the identified context. In some exemplary embodiments, existing personalized models belonging to the user may be scored against the identified context, and the personalized model that scored highest may be selected. In some exemplary embodiments, the matching model may be retrieved, obtained, or the like.

In some exemplary embodiments, in case all the existing personalized models belonging to the user have a matching score that is below a matching threshold, it may be determined that the participant does not have a trained personalized model that matches the identified context. In some exemplary embodiments, in case the participant does not have a trained model that matches the identified context, the existing one or more personalized models may not be retrieved, utilized, or the like. In some exemplary embodiments, in case the participant does not have a trained model that matches the identified context, but does have one or more trained models in a different context, the highest similarity scored model may be selected and retrieved therefrom. Additionally or alternatively, in case the participant does not have a trained model that matches the identified context, a general model of the participant's behavioral patterns that is not associated to a specific context may be utilized.

In some exemplary embodiments, the personalized model may be executed, processed, or the like, on at least a portion of the real-time media stream, e.g., in order to determine whether a behavioral pattern of the participant in the real-time media stream matches the behavioral pattern of the participant according to the personalized model. In some exemplary embodiments, the personalized model may be trained to indicate whether or not behavioral patterns of a participant matches the behavioral pattern of the participant in a communication stream.

In some exemplary embodiments, upon identifying a mismatch between the behavioral pattern of the participant in the real-time media stream and the behavioral pattern of the participant according to the personalized model, a responsive action may be performed. In some exemplary embodiments, the mismatch may be identified, e.g., at the personalized model, by determining that a difference between the behavioral pattern of the participant in the real-time media stream and the behavioral pattern of the participant according to the personalized model exceeds a threshold. In some exemplary embodiments, the responsive action may comprise generating an alert, a notification, or the like, e.g., indicating that the real-time media stream is forged. In some exemplary embodiments, the responsive action may comprise blocking the real time communication.

In some exemplary embodiments, the personalized model may comprise a classifier that is trained on a dataset. In some exemplary embodiments, the dataset may comprise media records depicting communications of the user with the participant in the communication context. In some exemplary embodiments, the dataset may comprise a first class of media and a second class of media. In some exemplary embodiments, the first class may comprise media records originally depicting the participant in a communication context. In some exemplary embodiments, the second class may comprise media records originally depicting other people excluding the participant in the communication context or in other communication contexts. In some exemplary embodiments, the personalized model may be trained to classify media as belonging to the first class or to the second class.

In some exemplary embodiments, deepfake or any other media manipulation techniques may be implemented on the first class, thereby obtaining processed records of the participant. In some exemplary embodiments, the manipulation techniques may be configured to replace the participant with different people excluding the participant, e.g., thereby creating forged media of the participant. In some exemplary embodiments, the manipulation techniques may be configured to replace the participant with the same participant, e.g., using a different image of the participant.

In some exemplary embodiments, manipulation techniques may be implemented on the second class, thereby obtaining forged records of the other people. In some exemplary embodiments, the manipulation techniques may be configured to replace the other people, e.g., with different people, with each other, with the participant, or the like. In some exemplary embodiments, the participant may be superimposed the over at least some of the other people. In some exemplary embodiments, the forged records of the participant may be added to the first class, while the processed forged of the other people may be added to the second class. This way, the classifier may be forced to identify the behavioral patterns of the participant.

In some exemplary embodiments, different personalized models for different participants may be trained to identify the participants in corresponding communications with the user. In some exemplary embodiments, a user may retain a personalized model for one or more participants with which he communicates, and each such participant may be considered to be a separate communication context. For example, communications of the user with a first person may be used to train a personalized model of the first person, and communications of the user with a second person may be used to train a personalized model of the second person. Based on the first and second models, any incoming call or other communication with the first or second person may be authenticated.

In some exemplary embodiments, different personalized models of the same participant may be trained to identify the participant in corresponding communication contexts, e.g., using corresponding datasets. In some exemplary embodiments, a first personalized model of the participant may be trained under a first communication context, a second personalized model of the same participant may be trained under a second communication context, and so on. For example, a first personalized model of the participant may be trained for interactions relating to monetary issues, while a second personalized model of the participant may be trained for interactions relating to family issues.

In some exemplary embodiments, a communication system of the user may be used to communicate between the user and the participant. In some exemplary embodiments, the communication system may be configured to retain communications between the user and the participant. In some exemplary embodiments, the communication system may be configured to generate a private or personalized model of the participant in the communication context, e.g., based on the retained communications between the user and the participant. In some exemplary embodiments, one or more aspects of the current subject matter may be implemented by the communication system.

One technical effect of utilizing the disclosed subject matter may be to authenticate digital media such as digital audio, videos, or the like, in a communication context, as being authentic or manipulated. In some exemplary embodiments, a classification of digital media as authentic or manipulated may be provided for any digital media stream incorporating features of a participant interacting in a communication context. In some exemplary embodiments, the disclosed subject matter enables to determine if a currently displayed participant was originally captured in the video or whether he was superimposed on the video by a manipulator. The disclosed subject matter enables to authenticate an identity of a participant in a real time media stream, such as a real time telephone call, video call, or any other digital communication medium, as well as in any other media file.

Another technical effect of utilizing the disclosed subject matter is to block media fabrication attacks used for spoofing communications such as phone calls, videos, audio messages, or the like. In some cases, the disclosed subject matter may be utilized to classify, in real time, whether incoming calls or video-based communications are authentic.

One technical problem dealt with by the disclosed subject matter is to authenticate that an identity of a participant is not being exploited in digital media. In some cases, it may be desired to monitor a digital media platform or network to identify media that portrays a person of interest, and authenticate it. In some cases, it may be desired to know whether or not malicious entities are exploiting the person's identity in one or more forged videos or audios.

Another technical problem dealt with by the disclosed subject matter is to limit GAN techniques (also referred to as "coevolution techniques") which may be used by a forging person or entity to improve a media fabrication capability. In some exemplary embodiments, coevolution techniques may be used as part of a technological "arm race" between deepfake creation techniques and deepfake detection techniques. In some exemplary embodiments, using coevolution or GAN techniques, as well as classification results of the personalized model, the forging person may be able to train his GAN framework to learn how to authenticate fraud media and bypass dedicated detectors such as the personalized model. In some cases, GAN techniques may be used to learn how to generate a fraud media file that overpasses the personalized model and is authenticated thereby without being detected as fraud. In some exemplary embodiments, a forging entity may train a GAN framework to utilize classification results of the personalized model for enhancing its ability to not to be spotted by the personalized model. In some exemplary embodiments, the GAN techniques may utilize classification results of the personalized model, which may be used as a deepfake detector, to learn how to avoid being spotted by the detector. For example, the GAN framework may create a plurality of different deepfake videos or audios and score them according to classification results from the personalized model, e.g., which may be provided by directly accessing the personalized model or by analyzing responsive actions.

One technical solution provided by the disclosed subject matter may be to continuously or intermittently monitor digital media of communication mediums via social media sites in order to detect fraud media that depicts a person of interest. In order to reduce a risk of being exploited by one or more GAN frameworks, an access to the personalized model may be limited, e.g., by placing the personalized model and its associated dataset in a secure location, or by securing the personalized model in any other manner, thereby limiting any direct usage of the personalized model. In some exemplary embodiments, the personalized model may be kept privately without being publicly accessible or available to untrusted third parties. Accordingly, it may be more difficult for a forging entity, that may wish to forge media, to use GAN frameworks to comply with the authentication requirements of the personalized model.

Additionally or alternatively, the personalized model may limit its scope to communication mediums, thereby reducing the amount of available classified media. In some exemplary embodiments, the personalized model may only classify real time communications such as telephone conversations, video calls, or the like, without attempting to authenticate uploaded media.

Additionally or alternatively, the personalized model may limit its scope to social media platforms. In some exemplary embodiments, the personalized model may evaluate viral media only in social media platforms that comply with a popularity criteria, media shared by non-suspicious profiles, or the like. In some cases, fraud users in social media sites may be identified by detecting a source of shared deepfake media, reporting suspicious profiles to corresponding social media sites, or the like, and may not be considered when determining compliance with the popularity criteria.

One technical effect of utilizing the disclosed subject matter is to verify that an identity of a participant is not being exploited in digital media. In some cases, a network may be monitored to find media that portray a person of interest, and the disclosed subject matter may be utilized to authenticate the media using the personalized model of the person.

Another technical effect of utilizing the disclosed subject matter is limiting GAN techniques that are used to improve a media fabrication capability. In some exemplary embodiments, as the disclosed subject matter secures the personalized model and limits a scope of classifications thereof, the GAN techniques may not have sufficient access to results of the personalized model, and therefore may not utilize classification of the results to improve a forging capability.

Referring now to FIG. 1 showing an illustration of a computerized environment, in accordance with some exemplary embodiments of the disclosed subject matter.

In some exemplary embodiments, Environment 100 may comprise a Device 110 of a user. Device 110 may be a smartphone, a smartwatch, a tablet, a Personal Computer (PC) or the like. Device 110 may comprise an Operating System (OS), a processor, a receiver, a transmitter, a memory, a network interface, or the like. Device 110 may be used for displaying, capturing, obtaining, or the like, digital media streams such as audio communications, video communications, voice messages, or the like, and authenticating them.

In some exemplary embodiments, Media Source 120 may be a digital media provider of Device 110 such as a server providing media such as radio or television broadcasting to Device 110, a displaying screen displaying media that can be captured by Device 110, or the like. Device 110 may be connected to a network, for example, through a BLUETOOTH™ connection, a WIFI™ connection, a local cellular connection, a Local Area Network (LAN), a Wide Area Network (WAN), or the like, and may obtain the digital media from a server via the network. In some exemplary embodiments, one or more applications, browsers, or the like of Device 110 may obtain the media stream from the server. In some exemplary embodiments, Media Source 120 may be a digital media displayer such as television screen which may be captured by Device 110, e.g., via a camera of Device 110. In some exemplary embodiments, the digital media may depict a communication between the user and Participant 150.

In some exemplary embodiments, Device 110 of the user may include a Personalized Model 130, which may be a private model of Participant 150 communicating with the user under a communication context. For example, Personalized Model 130 may include a model of Participant 150 with which the user of Device 110 is communicating, e.g., a friend of the user, a co-worker of the user, a spouse of the user, a family member of the user, or the like. In some exemplary embodiments, Personalized Model 130 may be configured to authenticate Participant 150 in the communication context, e.g., in real time, as the authentic participant or as a fraud. For example, upon receiving at Device 110 an audio or video call from Participant 150 which may be a father of the user, a Personalized Model 130 of Participant 150 in the communication context of the interaction may be executed on at least a portion of the call, in order to authenticate the identity of Participant 150. As an example, this may prevent a deepfake attack trying to forge Participant 150's identity in order to rob the user.

In some exemplary embodiments, Personalized Model 130 may be located at Device 110. Alternatively, Personalized Model 130 may be located at a server, a cloud network, or the like, and may be accessible to Device 110 in order to enable Device 110 to authenticate digital media of the participant in the certain communication context. In some exemplary embodiments, Personalized Model 130 may be trained on a Dataset 140, which may include digital media of Participant 150 in the communication context. In some exemplary embodiments, the Dataset 140 may include, for each model of a participant, previous interactions of the participant with the user of Device 110 in one or more communication contexts.

Figure 2:
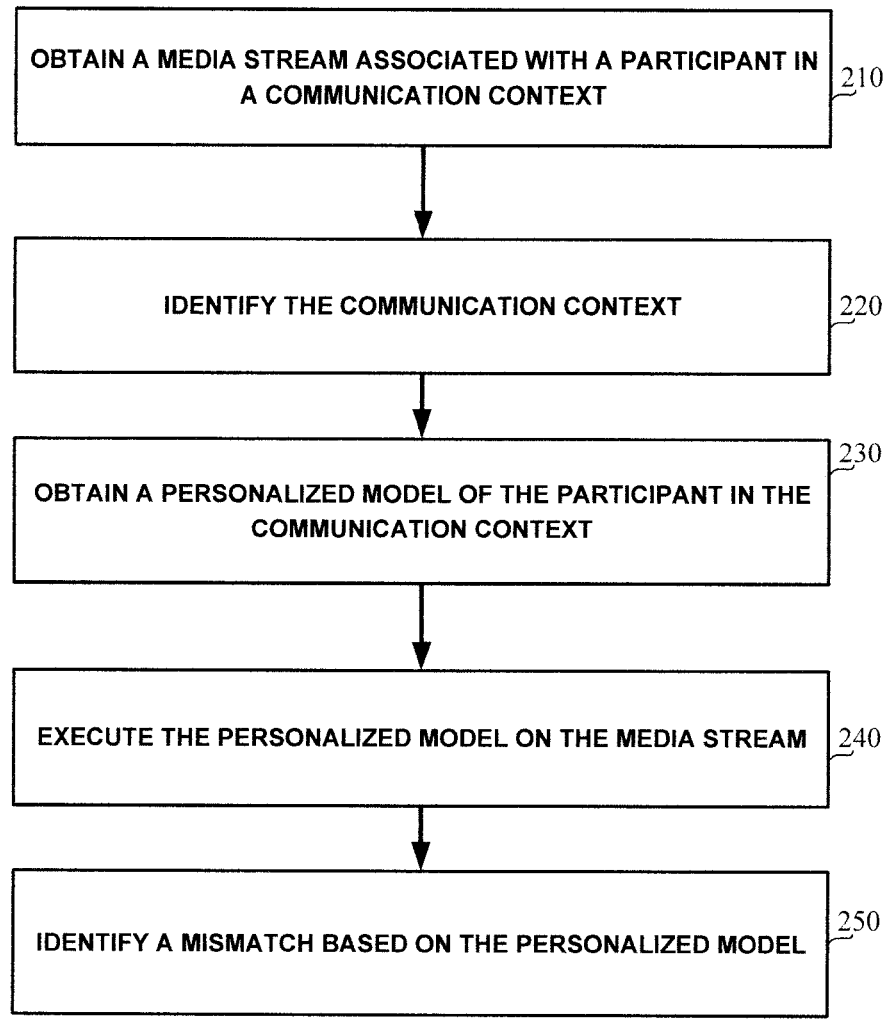
FIG. 2 shows a flowchart diagram of a method, in accordance with some exemplary embodiments of the disclosed subject matter.

Referring now to FIG. 2 illustrating a flowchart diagram of a method, in accordance with some exemplary embodiments of the disclosed subject matter.

On Step 210, a media stream associated with a participant may be obtained, e.g., in real-time. In some exemplary embodiments, the media stream may depict a real time communication of a user with the participant in a communication context. In some exemplary embodiments, the digital media may be obtained, for example, from a social media platform, a communication medium, or the like. For example, the digital file may be obtained during a real time communication from a video chat, a video conference, a phone call, a SKYPE™ session, or the like.

In some exemplary embodiments, the media stream may be identified as being associated with the participant based on identified features of the participant, a tag of the participant, metadata of the media stream such as a retained name of the participant, a combination thereof, or the like. For example, the metadata of the media stream may include a predefined name of the device with which the user is communicating, which may be assigned or defined by the user or by any other entity. In some exemplary embodiments, identified features of the participant may be identified using one or more facial recognition methods, audio recognition methods, or the like.

In some exemplary embodiments, the media stream may depict the user interacting with the participant, with a category of people including the participant, in a certain type of interaction with the participant, or the like. For example, the media stream may include an audio of a phone call between the user and his best friend (e.g., the participant), or an audio of a phone call between the user and a child of any identity (e.g., a category of the participant). In some exemplary embodiments, the participant may include a participant of a known, specific, and/or predetermined identity or category. In some exemplary embodiments, the participant may be part of a category of people such as people that are children, people that are friends of the user, people that are loud, customer service employees, or any other category of people that is defined as being dependent on the user or that is defined independently from the user. In some exemplary embodiments, a certain type of interaction may include, e.g., an interaction that is associated with business matters, an interaction that is associated with family matters, a calm interaction, a dispute, or the like.

On Step 220, the communication context of the participant may be identified. In some exemplary embodiments, the communication context may comprise an identity of the participant, a type of relationship between the participant and the user such as a friendship relationship, a co-working relationship, a romantic relationship, a family relationship, a business relationship, a customer-client relationship, or the like, a type of interaction between the participant and the user, or the like. In some cases, Step 210 may be implemented before or after Step 220. For example, digital media may be obtained based on an identification of a communication context of the participant therein, or vice versa, e.g., after obtaining the digital media, the communication context may be identified.

In some exemplary embodiments, one or more participants with which the user is interacting in the digital media may be identified using one or more facial recognition methods, audio recognition methods, tags, references, metadata, or any other digital media recognition technique. In some exemplary embodiments, a type of interaction may be identified based on one or more classifiers, tags, references, or the like. In some exemplary embodiments, several participants may be identified in the same digital media, such as in different segments thereof, different visible portions of the same segment, or the like. In some exemplary embodiments, steps 230-250 may be applied with respect to each identified participant in the digital media, with which the user is interacting.

On Step 230, a personalized model of the participant in communication with the user, e.g., in the communication context, may be obtained. In some exemplary embodiments, the personalized model may be configured to compare one or more typical behavioral patterns of the participant with identified patterns of the participant in digital media streams. In some cases, the personalized model may be trained to identify movement patterns of the participant such as a certain gait of the participant, how the participant moves, how the participant's face moves, frequently used phrases, typical face gestures, a symmetrical level of face gestures, how the participant talks, or the like.

In some exemplary embodiments, the personalized model of the participant may be retrieved upon identifying a corresponding personalized model in the corresponding context. In some exemplary embodiments, in case the personalized model, which may be retained at a user's possession, is determined to match the participant as well as the context of the media stream, the media stream or portions thereof may be provided to the personalized model for classification, e.g., in order to determine whether or not the digital media is authentic. In some exemplary embodiments, the personalized model of the participant may be retrieved upon determining that the user's device has a corresponding personalized model. For example, the context may include a type of a communication session between the user and the participant, an identity of the participant, a type of an identity of the participant, a type of digital media, a topic of communication that is associated with the digital media, or the like.

In some exemplary embodiments, the media stream may include a media file depicting the participant in a plurality of contexts, some of which being communication contexts for which a personalized model exists. In some cases, a media such as a video may depict the participant performing one or more activities and communications, which may include a communication having a communication context for which a model of the participant exists. In such cases, the portions of the video associated to the context may be extracted and authenticated using the model. For example, a model of the participant when communicating with children may be retained, and the video may include one or more portions in which the participant communicates with children. Such portions may be used to authenticate the identity of the participant, e.g., as forging entities may not have access to sufficient data depicting the participant communicating with children.

In some exemplary embodiments, in case the digital media is determined to have a different context from the communication context of the personalized model, the difference may be scored and compared to a context threshold, in order to determine whether the personalized model may be utilized for classifying the media. In some exemplary embodiments, a difference between communication contexts may relate to a communication medium, an identity of participant to the communication, an identity type of participants to the communication, a topic type of the communication such as standup or politics, or the like. For example, in case the communication context includes a communication relating to business topics, and the digital media depicts a communication relating to chores, the difference may or may not comply with the threshold. In some exemplary embodiments, a semantic classifier may be performed to identify a topic of an interaction, or a mood related to the interaction. In some exemplary embodiments, in case a personalized model matching the digital media is not detected, or if a matching personalized model has an inaccurate or incorrect context that does not comply with the context threshold, the digital media may be disregarded without being authenticated. Otherwise, the method may continue to Step 240.

In some exemplary embodiments, a private personalized model of the participant may be trained based on a dataset including a plurality of records of communications under the certain communication context. In some exemplary embodiments, the dataset may retain previous communications between the user and the participant, as well as digital media associated with the participant under a certain context. For example, a personalized model of communication between co-workers may be trained over a dataset including a plurality of records of communications between the co-workers. In some exemplary embodiments, the plurality of records of digital media may be accumulated by recording any such communication, e.g., via a camera, a Virtual Reality (VR) headset, Augmented Reality (AR) glasses, a microphone, or the like. For example, the personalized model of communications between the co-workers may include audio records of real life face-to-face conversations between the co-workers, telephone conversations between them, video conversations between them, or the like. In some exemplary embodiments, the plurality of records may include a stream of digital media captured by a user's Internet of Things (IoT) camera, his device's camera, an independent camera, or the like. For example, the user's camera may capture a SKYPE™ communication that is displayed on the user's computer screen. In some exemplary embodiments, the dataset may include accessible private or public media, retained previous communications with the participant, privately or publicly accessible databases of media, or the like, which may be captured under a certain communication context. In some cases, upon reaching a satisfying threshold of a dataset size, the dataset may be considered large enough for training a personalized model. In some exemplary embodiments, the personalized model may be implemented by a machine learning model, or any other type of classifier, which may be configured to identify behavioral patterns of a participant in a communication context.

For example, in case the user is Alice and the participant is Charlie, a personalized model of Charlie may be produced by Alice based on recorded communications between Alice and Charlie. Additionally, or alternatively, the personalized model of Charlie may be trained by Alice based on recorded communications between Alice and other people of the category of Charlie, e.g., having a similar relationship to Alice than Charlie. For example, in case Charlie is a brother of Alice, a personalized model of all of Alice's brothers including Charlie may be trained based on all of their mutual communications with Alice.

In some exemplary embodiments, at least some authenticated communication sessions may be used for training the personalized model. In some exemplary embodiments, recorded communications may be considered authenticated if they were recorded up to a certain period of time, such as up to a month ago, up to 3 weeks ago, or the like, and only if such recorded communications were not reported by the user or the participant as manipulated. In other cases, any recorded communications may be considered authenticated if they were not reported by the user as fraud. In some exemplary embodiments, recordings of a user communicating with a third party that are indicated by the user as fake, may be considered authentic, even if the third party denies such labeling. In some exemplary embodiments, audio or video recordings of actual real life meetings may be automatically considered authentic. In some exemplary embodiments, some communications or other digital media may be authenticated using automated techniques, such as based on cryptographic signature, using secured communication devices, or the like.

In some exemplary embodiments, the personalized model may be trained on a dataset including a first class including authentic media of the participant in scenarios associated with a communication context, or a modified version thereof. In some exemplary embodiments, the personalized model may be trained on a second class including media of different people, e.g., different from the participant, in the same context, or in a different context, which may be processed or be in an original form. In some exemplary embodiments, the personalized model may be trained to classify one or more media streams to determine whether they belong to the first or second class. In case the personalized model indicates that a media stream belongs to the first class, it may be determined to be an authentic media of the participant. In case the personalized model indicates that a media stream belongs to the second class, it may be determined to be a manipulated or deepfake media.

In some exemplary embodiments, the first and second classed may be obtained, generated, or the like, and utilized as a tagged dataset of the personalized model. In some exemplary embodiments, in order to create the first class for the dataset, deepfake techniques or other media fabrication techniques may be implemented on at least some of the authentic media of the participant to impersonate a plurality of different people, which may preserve the behavioral patterns of the participant under the context. In some exemplary embodiments, for generating the second class, deepfake techniques or other media fabrication techniques may be implemented on at least some of the media of the different people excluding the participant to impersonate any other people thereon, thereby preserving the behavioral patterns of the other people.

In some exemplary embodiments, the first class may include the modified authentic media of the participant, as well as unmodified authentic videos of the participant. In some exemplary embodiments, the first class may comprise fabricated media that is generated based on the authentic media of the participant, e.g., by superimposing different people on the participant, possibly including himself. Additionally, or alternatively, the first class may comprise fabricated media that is generated by two consecutive manipulations, such as replacing the participant by another person and then re-replacing the other person with the original participant. In such a case, the media may be manipulated media that exhibit manipulations associated with the utilization of the deepfake technology but still exhibit original conduct and behavior of the target person. Additionally, or alternatively, the first class of media may comprise fabricated media that is generated using a plurality of different alternative deepfake engines, such as may be available for public use. As a result, the first class may comprise at least some deepfake media that is generated using different techniques.

In some exemplary embodiments, the second class in the dataset may be obtained by implementing media fabrication techniques on media originally depicting people excluding the participant. In some cases, the media may capture a plurality of people excluding the participant, e.g., under the context, under any other second context, or the like. In some exemplary embodiments, media fabrication techniques may be applied to at least some of the media files to impersonate the participant thereover, to impersonate a group of other people thereover, or the like.

In some exemplary embodiments, each video or audio in the dataset may be labeled as belonging to the first or second class. In some exemplary embodiments, each media file of the first class that originally depicted the participant may be tagged or labeled as true, while each media of the second class that originally did not depict the participant may be tagged or labeled as false. In some cases, each modified or unmodified authentic media of the participant may be labeled as true, e.g., since it may depict true behavioral patterns of the participant under the context, even if not depicting accurately his face, body, voice, or the like. In some exemplary embodiments, media of the second class may be labeled as false, e.g., since it may not depict true behavioral patterns of the participant.

In some exemplary embodiments, during a training phase, the machine learning model may learn to separate the two classes by distinguishing what makes the participant the "real" participant, for example, based on identifying behavioral properties of the participant under the context which may not be successfully incorporated in fabricated versions of the participant. This way, the classifier may be forced to identify the behavioral patterns of the participant himself, without being able to rely on other information such as facial features or deepfake signatures. In some exemplary embodiments, in case the machine learning model will try to distinguish between the first and second classes by identifying specific deepfake effects that were used such as inconsistent boundaries or problems in specific patches, this may not work out since both classes may depict similar deepfake techniques. In some exemplary embodiments, in case the machine learning model will try to distinguish between the first and second classes based on facial recognition methods, its effort may not yield success since identical faces (e.g., the face of the participant, the faces of the predetermined people, or the like) may be featured in both classes.

In some exemplary embodiments, behavioral properties of a participant that may be utilized by the machine learning model to distinguish the participant from deepfake impersonations may include language properties such as words that are frequently used, a combination of words that is frequently used, frequent intonation patterns, grammar that is typically used, a certain structure of language, or the like. In some exemplary embodiments, behavioral properties of the participant that may be identified may include body behaviors such as certain facial movements, a certain gait, certain eye movements, a symmetry level of body movements, a relation between facial movements and content of a speech, a relation between facial movements and a corresponding intonation of speech, a relation between facial movement and hand movement, a relation between content of speech or intonation thereof and hand movement, combination thereof, or the like. In some exemplary embodiments, the machine learning model may learn any additional or alternative behavioral property that may be useful for distinguishing the first and second classes.

In some exemplary embodiments, more than one different personalized model may be trained for a same person, e.g., based on different contexts, relationships, or the like. For example, Alice may be a friend of Bob and a co-worker of Charlie. In such a case, Charlie may retain a personalized model of his co-worker Alice to determine whether or not phone calls or videos chats that are allegedly initiated by Alice have not been forged. At the same time, Bob may retain a different personalized model of his friend Alice, which is the same person, to determine whether or not phone calls or videos calls that are allegedly initiated by Alice have not been forged. In some cases, a context of interactions between Charlie and Alice may be characterized by a co-working relationship, while a context of interactions between Bob and Alice may be characterized by a causal friendship relationship. According to this example, the model of Alice used by Charlie may be trained on a dataset including recorded video and audio communications between Charlie and Alice, while the personalized model of Alice used by Bob may be trained on a dataset including recorded video and audio communications between Bob and Alice. Accordingly, behavioral patterns of the personalized model of Alice retained by Charlie may be at least slightly different than behavioral patterns of the personalized model of Alice retained by Bob, although they both depict unique behavioral patterns of Alice. For example, the personalized model retained by Charlie may be characterized by characteristics of a formal body language of Alice while the personalized model retained by Dave may be characterized by Alice's informal behavior.

On Step 240, the personalized model may be executed on at least a portion of the media stream to determine whether a behavioral pattern of the participant in the real-time media stream matches the behavioral pattern of the participant according to the personalized model. In some exemplary embodiments, the media stream may be inspected in real time, in order to provide a real time classification of the media stream.

In some exemplary embodiments, the stream may be monitored to identify portions depicting the participant under the communication context. In some cases, the portions may be identified using facial recognition methods, audio recognition methods, tags relating to the participant, references relating to the participant, or any other digital media recognition technique. In some exemplary embodiments, the portions of a continuous stream of media that depict a certain communication or context may be cropped. In some exemplary embodiments, patches depicting the participant's features may be extracted or cropped from the digital media. In some exemplary embodiments, communication sessions may include remaining portions that are irrelevant for a model, such as remaining portions that do not depict a communication between the user and the participant, remaining portions that do not depict the participant's features, or the like. For example, the digital media may include a video, and the person's features may be associated with a human object in one or more frames of the video. The associated human object, or frames depicting the associated human object, may be extracted from the digital media, e.g., to provide an extracted portion. In another example, the digital media may include an audio session, and the person's features may include his identified voice in the audio. In some cases, one or more sessions with the identified voice may be extracted from the audio stream and kept separately, e.g., to provide an extracted portion. In some cases, media may be cropped or processed using a facial recognition technique, an audio recognition technique, a manual crop or removal, or the like. In some cases, a classifier may be configured to cluster communications according to their contexts, type of communication, or the like.

As an example, Alice may wish to train a personalized model for identifying authentic communications with Bob using a video conference calls in which both of them participated. In such a case, Alice may utilize a face recognition technique, or manually crop the recorded video conference by removing portions in which Alice and Bob are not communicating with each other, in which Bob is not depicted, or portions in which Alice and Bob are not communicating in a specific interaction context. In some exemplary embodiments, the cropped portions may be used to train the personalized model of Bob, may be added to the dataset, or the like.

In some exemplary embodiments, the participant may be associated with a human object in one or more frames of a video stream. In some exemplary embodiments, the associated human object, or frames depicting the associated human object, may be extracted from the detected digital media. In some exemplary embodiments, portions of the digital media that feature a voice of the participant may be extracted from the audio. As another example, in a video conference call of four participants, the screen may be split into four corresponding regions each of which is associated with a different participant. In some exemplary embodiments, a personalized model of a participant may be executed or otherwise applied on the portion of the frame that is associated with the participant, such as the top-right quarter of the frame. Additionally, or alternatively, the display of the video conference call may intermittently switch between a split-screen mode and a main screen mode, such as showing a single participant (e.g., a participant who is considered active, who is speaking, or the like). The personalized model of the participant may be executed on frame segments in the split-screen mode that are associated with the participant, as well on main-screen mode frames in which the participant is the active participant being displayed. Additionally, or alternatively, the audio of the video conference may be segmented based on the identity of the current speaker, and the audio of the participant may be cropped and provided to the personalized model for further classification as being manipulated or authentic.

In some exemplary embodiments, two or more different personalized models of respective people may be utilized during a same communication session. For example, a communication session may include a video conference with four participants. A first participant may retain two personalized models matching a communication with two participants of the video conference. Accordingly, both personalized models may be applied to extracted video streams depicting the two participants, respectively, to determine, e.g., at the first participant's device, whether or not they are forged. In another example, an audio record may include a conversation between five people, a first participant thereof having three personalized models that match three of the remaining participants. The matching personalized models may be applied to audio patches depicting the corresponding participant, to determine whether the participant's input (e.g., his voice) is forged. In some exemplary embodiments, in case some of the personalized models do not match the communication context, those personalized models may not be utilized.

In some exemplary embodiments, an authenticity of the media stream may be determined, e.g., by executing the personalized model of the participant on cropped portions of the media stream, on the entire media stream, or the like. In some exemplary embodiments, In some exemplary embodiments, the personalized model of each participant may classify the media stream as belonging to the first class or to the second class, thereby determining whether the identified patterns of the participant match his typical behavioral patterns. In some exemplary embodiments, a classification of a portion as belonging to the first class may indicate that the digital media entity is authentic, while a classification of the portion as belonging to the second class may indicate that the portion is not authentic and has been tampered with. In case one or more portions of the media stream are classified as authentic, and one or more other portions of the media stream are classified as fraud, the entire media stream may be considered to be manipulated, tagged as such, or the like.

In some exemplary embodiments, a fabricated media stream of the participant in the communication context may violate the personalized model of the participant in the communication context, while an authentic media stream of the participant in the communication context may comply with the personalized model of the participant. In some exemplary embodiments, malicious or fabricating identities may be forced to efficiently imitate a behavioral pattern of the participant under the communication context in order to overpass the personalized model's classification, which may a be very challenging requirement that requires a large quantity of personal communications of the participant in the context. This may extremely reduce a possibility of producing fraud media of the participant that complies with the participant's personalized model.

For example, the personalized model may determine whether or not the participant depicted in the digital media has movements and/or behavioral patterns that correspond to the participant's typical behavioral patterns during a similar session or context, e.g., as identified by the personalized model. In some cases, in case the movements or behavioral patterns that are identified in the digital media are classified by the personalized model as not matching the participant, the digital media may be determined to be forged. For example, it may be determined that the participant's features such as face, body, or voice has been superimposed on a media stream using one or more media fabrication or deepfake technologies. In some cases, in case the movements or behavioral patterns that are identified in the digital media are classified by the personalized model as matching the person, the digital media may be determined to be authentic.

On Step 250, upon identifying a mismatch between the behavioral pattern of the participant in the real-time media stream and the behavioral pattern of the participant according to the personalized model, a responsive action may be performed. In some exemplary embodiments, the mismatch may be identified by the personalized model. In some exemplary embodiments, the responsive action may include an alert indicating the communication is forged at least in part, a notification the communication is forged at least in part, blocking of an ongoing communication, or the like.

In some exemplary embodiments, at the end of the communication, the user may obtain a verification indication from the user, indicating whether or not the personalized model's classification was accurate. In some exemplary embodiments, the verification indication may be obtained in an authenticated manner, such as in a real life meeting with the participant, or using a secured medium such as a cryptographic signature, a personal password, using secured communication devices, or the like. In some exemplary embodiments, the verification indication may be used to tag the communication as correctly classified or incorrectly classified, which may be used for enhancing the personalized model by further training.

Figure 3:
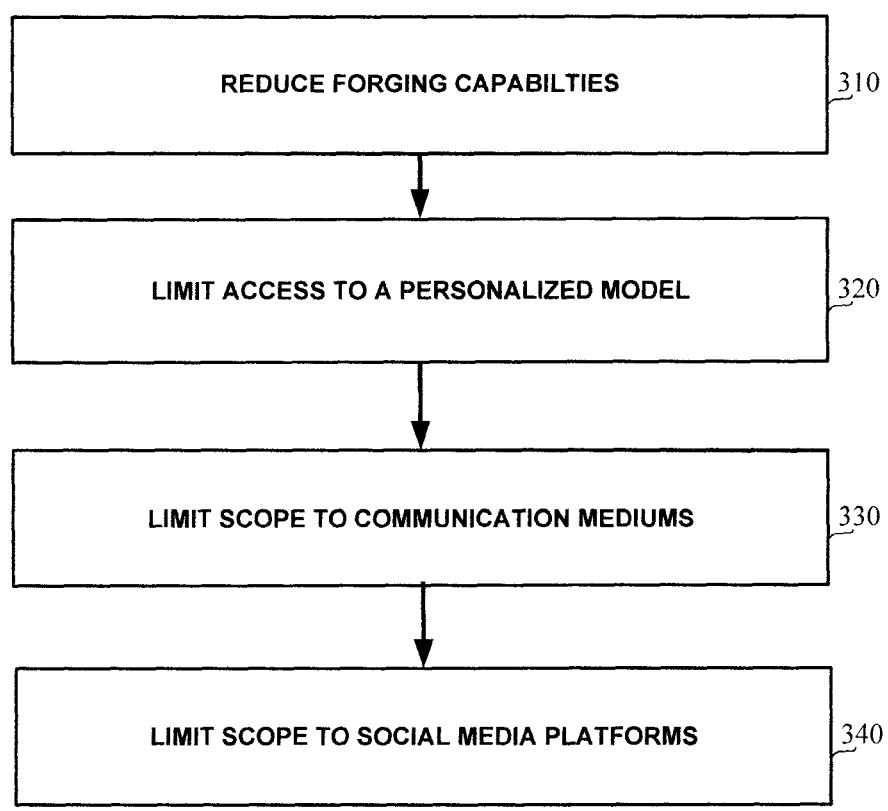
FIG. 3 shows a flowchart diagram of a method, in accordance with some exemplary embodiments of the disclosed subject matter.

Referring now to FIG. 3 illustrating a flowchart diagram of a method, in accordance with some exemplary embodiments of the disclosed subject matter.

On Step 310, forging capabilities of malicious entities or any other entity may be reduced using one or more of Steps 320-340. In some exemplary embodiments, a forging entity may train a classifier such as utilizing a GAN framework to utilize classification results of the personalized model for enhancing its ability to be unspotted by the personalized model. For example, the GAN framework may create a plurality of different deepfake videos or audios and score them according to classification results from the personalized model, e.g., which may be provided by directly accessing the personalized model or by analyzing which media is detected as fraud based on detected responsive actions. For example, in case fabricated media is removed from a social network, the GAN framework may monitor its fabricated media to see which ones are removed and which ones remain in the network, and use the results to enhance its capabilities.

On Step 320, access to a personalized model of a participant may be at least partially limited. In some exemplary embodiments, for the GAN framework to be able to learn how to overcome the personalized model, it may utilize a direct access to the personalized model in order to obtain classification results therefrom. In some exemplary embodiments, in order to avoid such usage of the personalized model, the personalized model may be located at a secure location such as a remote server, a confidential server, a secure node or device, or at any other location that does not provide public access and is not easily broken into. In some exemplary embodiments, the personalized model may be kept at a non-secure location that is secured using one or more security mechanisms such as passwords, keys, or the like. In some exemplary embodiments, keeping the personalized model at a secure location or in a secure manner may reduce a risk of being exploited by one or more GAN frameworks or any other media fabrication technique.

In some exemplary embodiments, in addition to the personalized model itself, any data used for its training, e.g., an initial dataset and any addition thereto, such as real time communications, may be kept securely in the same secure location as the personalized model, or in a different secure location that is accessible to the personalized model. In some exemplary embodiments, the data may be retained using security mechanisms that correspond to those used for the personalized model, or any other security mechanisms.

On Step 330, the personalized model may limit its scope to communication mediums alone, e.g., to further reduce a risk of being exploited by one or more GAN frameworks. In some exemplary embodiments, the personalized model may be configured to continuously or intermittently monitor, e.g., at its secure location, digital media of communication mediums such as FACEBOOK™ video calls, or via any other medium. In some exemplary embodiments, the monitored communication mediums may be monitored for media that depicts one or more people, e.g., as determined by the user. For example, a user may train a personalized model of himself to identify his behavioral patterns, and monitor communication mediums depicting himself, in order to apply the model thereon. From the point of view of a forging entity, it may not be feasible to train a network on classification results from real time communication mediums alone, e.g., since such efforts may be easily spotted and blocked. In other cases, the personalized model may not limit its scope to certain mediums.

On Step 340, the digital media may limit its scope to social media platforms, e.g., to further reduce a risk of being exploited. In some exemplary embodiments, digital media from social network platforms may be continuously or intermittently monitored, and media for classification may be selected based on a popularity criteria, a quality of popularity criteria, or the like. For example, the digital media may be considered popular or trendy in case it is shared a number of times that overpasses a popularity threshold, by different users that are considered to be authentic users, or the like. In other cases, the personalized model may not limit its scope to certain platforms.

In some exemplary embodiments, due to the popularity criteria, only viral media may be evaluated and classified by the personalized model. In some exemplary embodiments, media may be evaluated by the personalized model only when exceeding the popularity criteria. For example, only media that has been shared over a certain number of times, e.g., 10 or any other number, may be evaluated. In another example, the popularity criteria may utilize one or more metrics provided by social media platforms such as impressions, Click-Through Rate (CTR), or the like. In another example, the popularity criteria may be based on any other information relating to a popularity trend of the media. In some exemplary embodiments, media may not be considered viral if shared and viewed by fraud profiles. For example, in case the popularity criteria require sharing of content by at least ten users, and ten users were found to upload and share with each other a thousand media files, the popularity criteria may not be considered to be fulfilled. Specifically, these profiles may be considered to be fraud and may not be used for calculating the popularity criteria when determining a number of shares of the content. In some exemplary embodiments, only authentic profiles may be used for calculating the popularity criteria. This may reduce even more a possibility of implementing the coevolution or GAN techniques.

In some exemplary embodiments, user profiles that perform suspicious action such as profiles that posted or uploaded one or more fabricated videos or other media may be detected and reported. In some exemplary embodiments, one or more types of analyses may be performed in order to detect a source of shared deepfake media and to detect a first profile that uploaded each deepfake media. In some cases, suspicious profiles that are detected using the analyses may be reported as such to corresponding social media sites. In some cases, social media sites may deploy in-house techniques to identify fraud profiles, which may be further utilized for reducing fraud attempts. These in-house techniques may be at least partially relied upon for further limiting a possibility of applying coevolution or GAN techniques.

In order to implement the coevolution or GAN techniques when the scope tis limited to social media platforms with the popularity criteria, the forging entity may be required to create a plurality of fabricated media files and post them on social media sites, e.g., in order to obtain indirect classifications of the personalized model. In some exemplary embodiments, the forging person may now be required to obtain a large number of high quality responses and shares from authenticated profiles in response to each uploaded media, in order to be able to obtain an indirect classifications of the personalized model.

Figure 4:
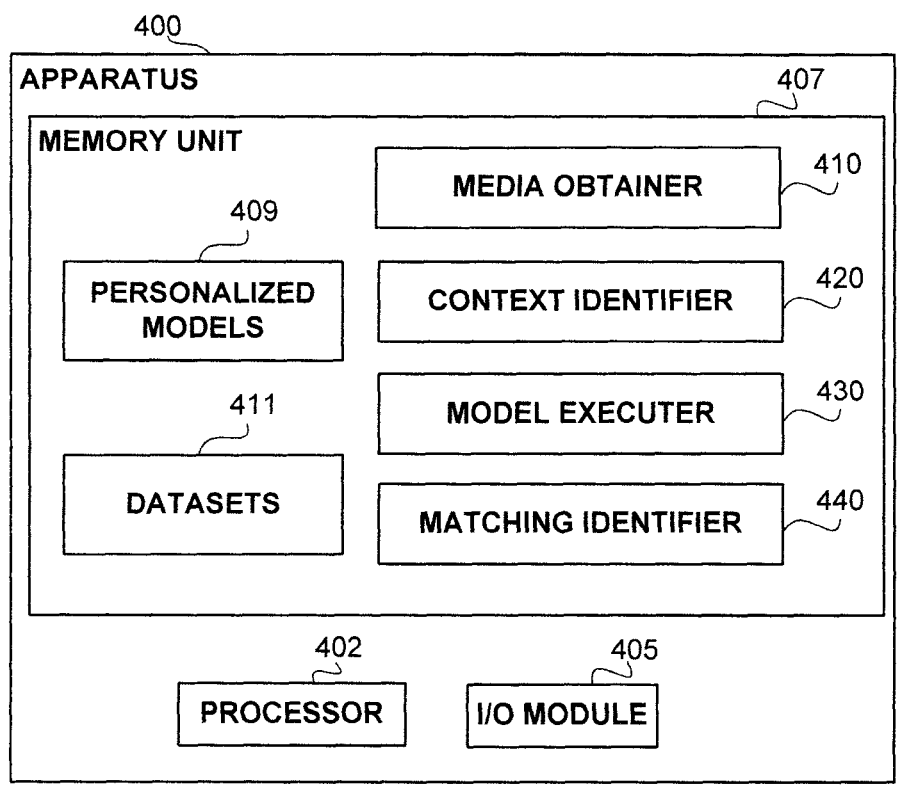
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, an Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents. Processor 402 may be configured to execute computer-programs useful in performing the methods of FIGS. 2-3, or the like.

In some exemplary embodiments of the disclosed subject matter, an Input/Output (I/O) Module 405 may be utilized to provide an output to and receive input from a user. I/O Module 405 may be used to transmit and receive information to and from the user or any other apparatus, e.g., a plurality of user devices, in communication therewith.

In some exemplary embodiments, Apparatus 400 may comprise a Memory Unit 407. Memory Unit 407 may be a short-term storage device or long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of Apparatus 400. In some exemplary embodiments, Memory Unit 407 may retain program code operative to cause Processor 402 to perform acts associated with any of the steps in FIGS. 2-3, or the like.

In some exemplary embodiments, Memory Unit 407 may comprise one or more Personalized Models 409. In some exemplary embodiments, each model of the Personalized Models 409 may correspond to a communication of a user with a certain participant, a category of participant, or the like, in a communication context. In some exemplary embodiments, Personalized Models 409 may be configured to authenticate media streams by comparing identified patterns of a depicted participant with typical patterns of the depicted participant as identified by the associated model. In some exemplary embodiments, Personalized Models 409 may be located elsewhere, such as at a server, a cloud network, or the like, in a location that is accessible by the Apparatus 400. In some exemplary embodiments, each model of the Personalized Models 409 may comprise a supervised machine learning model that is trained on a corresponding dataset of Datasets 411.

In some exemplary embodiments, Memory Unit 407 may comprise Datasets 411, which may comprise one or more datasets that may be utilized for training Personalized Models 409. Datasets 411 may comprise media depicting previous communications of participants with the user. In some exemplary embodiments, each video or audio in Datasets 411 may be labeled as belonging to a first or second class, the first class originally depicting the corresponding participant, and the second class originally not depicting the corresponding participant. In some exemplary embodiments, within a class, different fabrication and deepfake techniques may be implemented. In some exemplary embodiments, media belonging to the first class may be tagged as true, while media belonging to the second class may be tagged as false, e.g., for training purposes of the supervised machine learning model.

The components detailed below may be implemented as one or more sets of interrelated computer instructions, executed for example by Processor 402 or by another processor. The components may be arranged as one or more executable files, dynamic libraries, static libraries, methods, functions, services, or the like, programmed in any programming language and under any computing environment.

In some exemplary embodiments, Media Obtainer 410 may be configured to obtain a digital media stream from a media source, e.g., a server, a displayed communication such as on a screen, or the like. Media Obtainer 410 may be configured to capture the media stream via I/O Module 405, via a camera capturing a screen, via one or more communication applications of a user device associated with Apparatus 400, or via any other component or device.

In some exemplary embodiments, Context Identifier 420 may be configured to obtain a captured media stream from Media Obtainer 410, and process the media stream to identify a context thereof. In some exemplary embodiments, Context Identifier 420 may be configured to extract or crop from the media stream portions that depict one or more participants of interest, or types thereof, for which one or more models of Personalized Models 409 are trained. In some exemplary embodiments, Context Identifier 420 may identify a communication context of the portions, such as the participants of interest themselves, the category thereof, a topic of the interaction, or the like.

In some exemplary embodiments, Model Executer 430 may be configured to obtain media stream portions and contexts thereof from Context Identifier 420, and identify whether Personalized Models 409 comprises associated models with an associated context. In some exemplary embodiments, Model Executer 430 may be configured to apply a corresponding model of Personalized Models 409 on each media portion, in case the corresponding model is found for the media portion.

In some exemplary embodiments, Matching Identifier 440 may be configured to obtain classification results from Model Executer 430, and identify based thereon whether the media stream matches the associated model of the Personalized Models 409. In case a match is found, Matching Identifier 440 may determine that the media stream is authentic. In case a mismatch is found, Matching Identifier 440 may determine that the media stream is fabricated.

In some exemplary embodiments, Apparatus 400 may be implemented within a communication system, such as a phone communication system, a video communication system, or the like, of a user, which may retain for each participant of interest models to be applied during communications with the participants of interest.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a dataset, the dataset comprises media records depicting communications of a participant in a communication context, wherein the dataset comprises media belonging to a first class of media and to a second class of media, wherein the first class of media comprises media records originally depicting the participant in the communication context, wherein the second class comprises media records originally depicting other people excluding the participant in the communication context; said obtaining comprises:
implementing media fabrication techniques on the first class, thereby obtaining processed records of the participant, wherein said media fabrication techniques are configured to replace the participant with different people excluding the participant,
implementing media fabrication techniques on the second class, thereby obtaining processed records of the other people, wherein said media fabrication techniques are configured to replace the other people,
adding the processed records of the participant to the first class, and
adding the processed records of the other people to the second class; and
training a personalized model of the participant when communicating in the communication, context, said training is performed based on the dataset, whereby the personalized model is trained to classify media as belonging to the first class of media or to the second class of media;
the method further comprising: obtaining a media stream associated with the participant, wherein the media stream depicting a real-time communication of the participant in the communication context;
identifying the communication context;
executing the personalized model on at least a portion of the media stream to determine whether a behavioral pattern of the participant in the media stream matches the behavioral pattern of the participant according to the personalized model; and upon identifying a mismatch between the behavioral pattern of the participant in the media stream and the behavioral pattern of the participant according to the personalized model, performing a responsive action.

2. The method of claim 1, wherein the responsive action comprises generating an alert or blocking the real-time communication, wherein the alert indicates that the media stream is forged.

3. The method of claim 1, wherein said identifying the mismatch comprises determining that a difference between the behavioral pattern of the participant in the media stream and the behavioral pattern of the participant according to the personalized model exceeds a threshold.

4. The method of claim 1, wherein said implementing the media fabrication techniques on the second class comprises superimposing the participant over at least some of the other people.

5. The method of claim 1, further comprising training a second personalized model of the participant under a second communication context, the second communication context is different from the communication context.

6. The method of claim 1, wherein the communication-lcontext is selected from a group consisting of: a friendship relationship, a co-working relationship, a family relationship, a business relationship, a customer-client relationship, and a romantic relationship.

7. The method of claim 1, wherein the communication context comprises a topic of the real-time communication.

8. The method of claim 1 comprising determining an identity of the participant based on at least one of:
a facial recognition method implemented on the media stream,
an audio recognition method implemented on the media stream,
metadata of the media stream, and
tags relating to the participant that are attached to the media stream,
wherein the communication context comprises the identity of the participant.

9. The method of claim 1,
wherein said identifying the communication context comprises determining a second participant in the real-time communication, wherein the media stream depicts the real-time communication between the participant and the second participant;
wherein the communication context is a context of the participant communicating with the second participant; and
wherein the personalized model is a private model that is trained based on past communications between the participant and the second participant, wherein the past communications are not publicly accessible.

10. The method of claim 1, wherein the behavioral pattern of the participant comprises at least one of: face movements of the participant, face gestures of the participant, a gait of the participant, a walking pattern of the participant, hand movements of the participant, frequently used phrases of the participant, a talking manner of the participant, or a voice pattern of the participant.

11. The method of claim 1 implemented on a communication system used by a second participant, wherein the communication context is a communication between the participant and the second participant, wherein the communication system is configured to retain communications between the participant and the second participant and to generate a private model for the communication context based on the retained communications.

12. A computer program product comprising a non-transitory computer readable storage medium retaining program instruction, which program instructions when read by a processor, cause the processor to perform:
obtaining a dataset, the dataset comprises media records depicting communications of a participant in a communication context, wherein the dataset comprises media belonging to a first class of media and to a second class of media, wherein the first class of media comprises media records originally depicting the participant in the communication context, wherein the second class comprises media records originally depicting other people excluding the participant in the communication context;
said obtaining comprises:
implementing media fabrication techniques on the first class, thereby obtaining processed records of the participant, wherein said media fabrication techniques are configured to replace the participant with different people excluding the participant,
implementing media fabrication techniques on the second class, thereby obtaining processed records of the other people, wherein said media fabrication techniques are configured to replace the other people,
adding the processed records of the participant to the first class,
and
adding the processed records of the other people to the second class; and
training a personalized model of the participant when communicating in the communication context, said training is performed based on the dataset, whereby the personalized model is trained to classify media as belonging to the first class of media or to the second class of media,
the computer program product further comprising: obtaining a media stream associated with the participant, wherein the media stream depicting a real-time communication of the participant in the communication context;
identifying the communication context;
executing the personalized model on at least a portion of the media stream to determine whether a behavioral pattern of the participant in the media stream matches the behavioral pattern of the participant according to the personalized model; and
upon identifying a mismatch between the behavioral pattern of the participant in the media stream and the behavioral pattern of the participant according to the personalized model, performing a responsive action.

13. The computer program product of claim 12, wherein the communication context is selected from a group consisting of: a friendship relationship, a co-working relationship, a family relationship, a business relationship, a customer-client relationship, and a romantic relationship.

14. The computer program product of claim 12, wherein the communication context comprises a topic of the real-time communication.

15. The computer program product of claim 12, wherein the instructions, when read by the processor, cause the processor to determine an identity of the participant based on at least one of: a facial recognition method implemented on the media stream, an audio recognition method implemented on the media stream, metadata of the media stream, and tags relating to the participant that are attached to the media stream, wherein the communication context comprises the identity of the participant.

16. The computer program product of claim 12, wherein the instructions, when read by the processor, cause the processor to train a second personalized model of the participant under a second communication context, the second communication context is different than the first communication context.

17. A system comprising a processor and coupled memory, the processor being adapted to perform:
   obtaining a dataset, the dataset comprises media records depicting communications of a participant in a communication context, wherein the dataset comprises media belonging to a first class of media and to a second class of media, wherein the first class of media comprises media records originally depicting the participant in the communication context, wherein the second class comprises media records originally depicting other people excluding the participant in the communication context;
   said obtaining comprises:
   implementing media fabrication techniques on the first class, thereby obtaining processed records of the participant, wherein said media fabrication techniques are configured to replace the participant with different people excluding the participant,
   implementing media fabrication techniques on the second class, thereby obtaining processed records of the other people, wherein said media fabrication techniques are configured to replace the other people,
   adding the processed records of the participant to the first class, and
   adding the processed records of the other people to the second class; and
   training a personalized model of the participant when communicating in the communication context, said training is performed based on the dataset, whereby the personalized model is trained to classify media as belonging to the first class of media or to the second class of media,
   the system further comprising: obtaining a media stream associated with the participant, wherein the media stream depicting a real-time communication of the participant in the communication context;
   identifying the communication context;
   executing the personalized model on at least a portion of the media stream to determine whether a behavioral pattern of the participant in the media stream matches the behavioral pattern of the participant according to the personalized model; and
   upon identifying a mismatch between the behavioral pattern of the participant in the media stream and the behavioral pattern of the participant according to the personalized model, performing a responsive action.

* * * * *